(No Model.) 7 Sheets—Sheet 1.

W. W. HASTINGS.
AUTOMATIC SCREW MACHINE.

No. 463,626. Patented Nov. 24, 1891.

Fig. 1.

Witnesses.
John Edwards Jr.
D. W. Reynolds

Inventor.
Walter W. Hastings.
By James Shepard.
Atty.

(No Model.) 7 Sheets—Sheet 2.

W. W. HASTINGS.
AUTOMATIC SCREW MACHINE.

No. 463,626. Patented Nov. 24, 1891.

Witnesses.
John Edwards Jr.
D. H. Reynolds

Inventor.
Walter W. Hastings.
By James Shepard.
Atty (No Model.)

W. W. HASTINGS.
AUTOMATIC SCREW MACHINE.

No. 463,626. Patented Nov. 24, 1891.

Witnesses.
John Edwards Jr.
D. W. Reynolds

Inventor.
Walter W. Hastings.
By James Shepard
Atty (No Model.)  
7 Sheets—Sheet 4.

W. W. HASTINGS.
AUTOMATIC SCREW MACHINE.

No. 463,626. Patented Nov. 24, 1891.

Witnesses.
John Edwards Jr.
D. W. Reynolds

Inventor.
Walter W. Hastings.
By James Shepard.
Atty.

(No Model.) 7 Sheets—Sheet 5.

W. W. HASTINGS.
AUTOMATIC SCREW MACHINE.

No. 463,626. Patented Nov. 24, 1891.

Witnesses.
John Edwards Jr.
D. V. Reynolds

Inventor.
Walter W. Hastings.
By James Shepard.
Atty.

(No Model.)  
7 Sheets—Sheet 7.

W. W. HASTINGS.
AUTOMATIC SCREW MACHINE.

No. 463,626. Patented Nov. 24, 1891.

Witnesses.  
John Edwards Jr.  
D. W. Reynolds

Inventor.  
Walter W. Hastings.  
By James Shepard  
Atty.

UNITED STATES PATENT OFFICE.

WALTER W. HASTINGS, OF JERSEY CITY, NEW JERSEY.

AUTOMATIC SCREW-MACHINE.

SPECIFICATION forming part of Letters Patent No. 463,626, dated November 24, 1891.

Application filed May 29, 1891. Serial No. 394,590. (No model.)

*To all whom it may concern:*

Be it known that I, WALTER W. HASTINGS, a citizen of the United States, residing at Jersey City, in the county of Hudson and State of New Jersey, have invented certain new and useful Improvements in Automatic Screw-Machines, of which the following is a specification.

My invention relates to improvements in automatic screw-machines; and the general object of my improvement is to improve the efficiency of the machine, while the parts are of a simple construction, considering the amount of work done by the machine.
In the accompanying drawings, Figure is a plan view of my machine.

B is the frame of the head-block, and C the frame of the tail-block, the two being mounted upon the front side of the bed in alignment with each other, so that the cam-shaft D may extend through suitable bearings in both of said frames.

Within suitable bearings in the head-block is the live-spindle, consisting of an outer sleeve 16, an inner sleeve 17, having the holding-chuck 18, a sliding intermediate sleeve 19 between said outer and inner sleeves, and a feeding tube or spindle 20 on the inside of said inner sleeve. The outer and inner sleeves 16 and 18 are connected together at the left-hand end by the nut 21, as shown most clearly in Fig. 4, whereby said outer and inner sleeves are made rigid with each other, both being held in their bearings so as not to move longitudinally. The holding-chuck 18 is an ordinary construction of spring-chucks, and the chuck end of the feed-tube is split or slotted in the ordinary form of spring feeding-tubes.

Figures 3, 4:
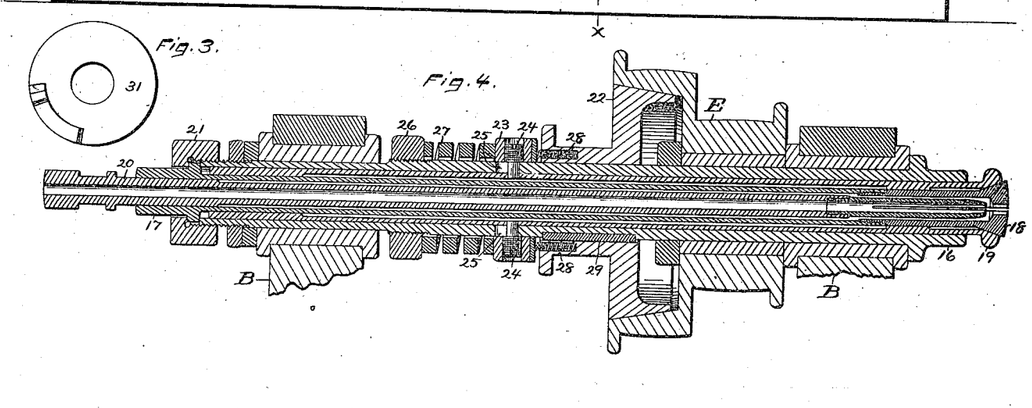
Fig. 3 is a side elevation of the cam for operating the friction-clutch.
Fig. 4 is a central longitudinal section of the spindle and connected parts, the same and the following figures, with the exception of Fig. 17, being on a scale twice that employed in making the preceding figures.

E designates the driving-pulley for the live-spindle, upon the inside of which is the friction-clutch 22. 23 designates a sliding collar connected by screws 24 to the intermediate sliding tube 19, the shanks of the screws passing through slots 25, Fig. 4, in the outer sleeve 16. An adjustable collar 26 is screwed upon the outer sleeve 16, and between it and the collar 23 is a stout spring 27. Between the sliding collar 23 and the hub of the clutch 22, I interpose light spiral springs 28, as shown in Fig. 4. It will of course be understood that the friction-clutch slides longitudinally on the spindle, being held against independent rotation by means of a spline or other ordinary device for such purpose, as at 29, Fig. 4.

Figure 2:
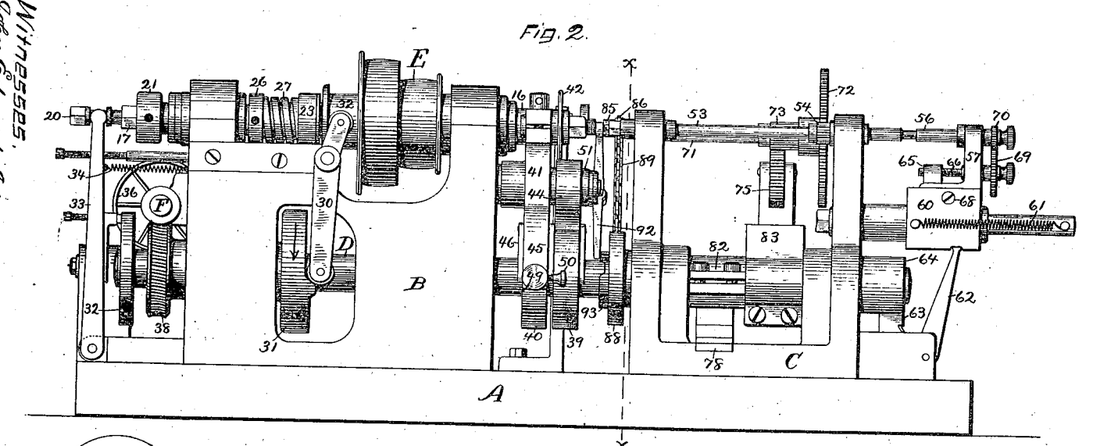
Fig. 2 is a front elevation of the same.

30 designates a shipping-lever pivoted to the frame B of the head-block, with one end engaging the hub of the friction-clutch 22 and its other end engaged by a cam 31 on the cam-shaft D, whereby the clutch is operated to withdraw it from the wheel, and when released by the cam the collar 23 and clutch 22 are forced back again by the spring 27 until the collar is stopped by its screws reaching that end of its slots, after which the light spiral springs alone hold the clutch in place. In thus withdrawing the clutch from the pulley the sliding collar carries with it the interposed sleeve 19 and moves it back from the bevel of the holding-chuck 18 sufficiently to permit said jaws to spring open. When this sleeve 19 is returned to its normal position by said spring 27, the chuck is again closed. The cam 32 on the cam-shaft D acts upon the lever 33 to draw back the feed-tube 20 at a time when the holding-jaws are grasping the wire, and it is returned by means of a spring 34, Fig. 2, at a time when the holding-chuck is released, so that the wire within the feed-tube is carried forward in the ordinary manner of feeding wire in analogous machines.

Figure 15:
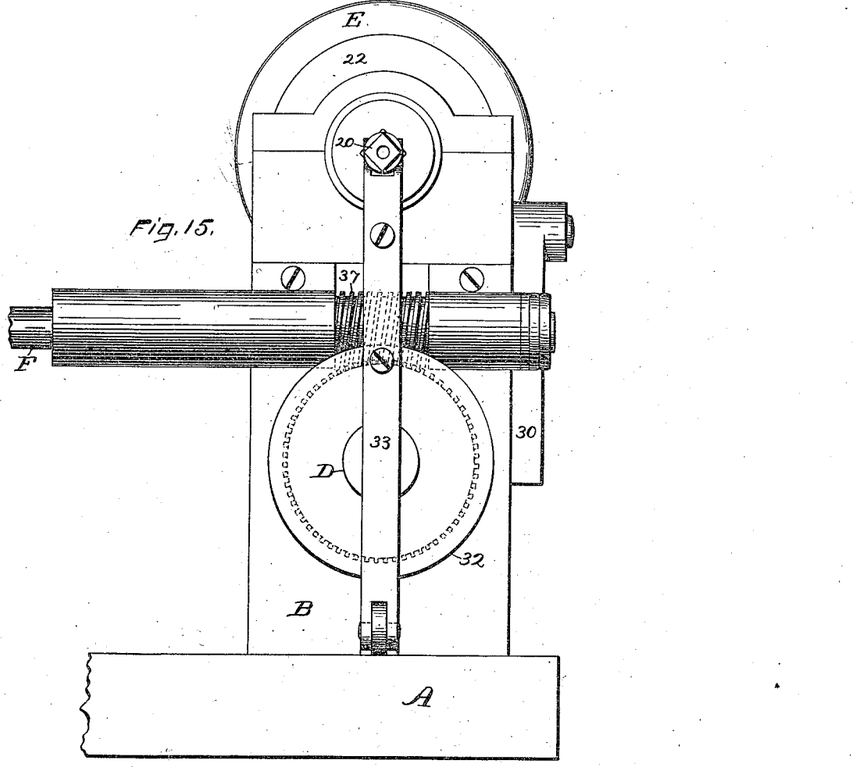
Fig. 15 is an end view of the front part of the machine, showing the left-hand end of Fig. 1.
Figure 16:
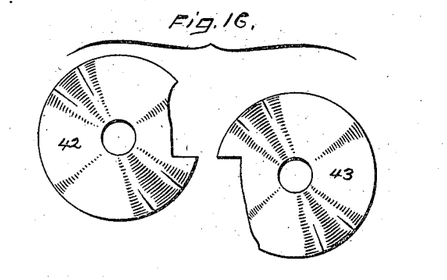
Fig. 16 is a detached side elevation of the cutters.

The cam-shaft D is operated by a worm-gear in connection with the shaft F, which stands at right angles to the cam-shaft and is supported by suitable bearings on the frame B of the head-block at its front ends and by bearings in the post or bracket 25. This shaft is driven by a belt running over the pulley 36 from any suitable source. The worm 37, toward the front end of the shaft F, (see Fig. 15,) engages with and drives the worm-wheel 38, Fig. 2, the same being also indicated by broken lines in Fig. 15.

Upon the cam-shaft D between the head and tail blocks are the cutter-operating cams 39 and 40.

Figures 5, 6:
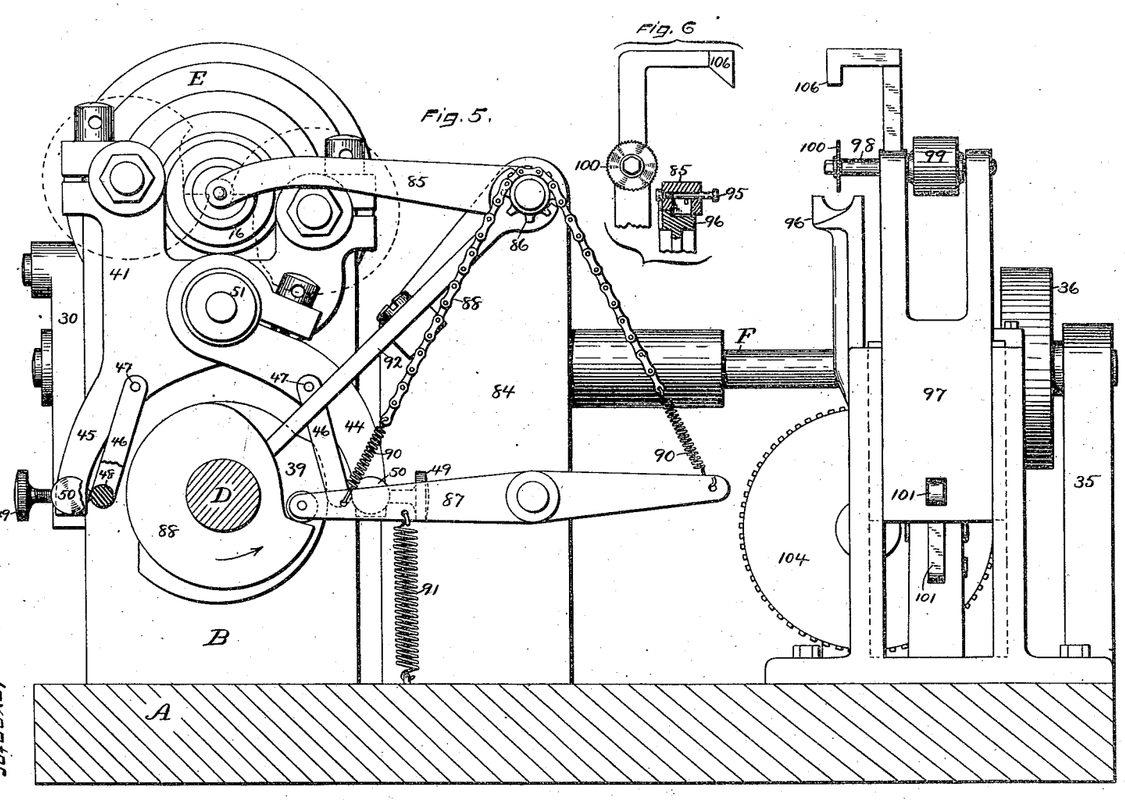
Fig. 5 is a sectional view of the cam-shaft
25 and bed on line $x$ $x$ of Fig. 2, the parts to the left of said line being shown in side elevation.
Fig. 6 is a front view of detached parts, partly in section, illustrating, principally, the slotting-saw and knockout devices.

Pivoted to the head-block frame B is the cutter-head 41, in which I mount the chisels or cutters 42 and 43, the contour of said cutters being indicated by broken lines in Fig. 5. The cutter-head 41 is provided with rocking arms 44 and 45, one for engaging each of the cams 39 and 40. Each rocking arm is provided on its inside with a swinging bail 46, pivoted to said arm at 47, Fig. 5, the two side bars of the bail being connected on the inside of said arms by a cross-piece 48. At the left-hand side of Fig. 5 one of the side pieces of the bail is represented as broken away, so as to show the cross-piece 48 in section. Each rocking arm is also provided with an adjusting-screw 49, the end of which rests against the cross-piece 48 of each bail. Turning this screw in or out will hold the bail nearer to or farther from the cams 39 and 40, so as to impart a greater or less movement to said rocking arms and the cutter-head. A set-screw 50 is employed to bind the adjusting-screws 49 in place after each adjustment. The rocking arm 45 is made integral with the cutter-head 41, while the rocking arm 44, although adjustable on said head, is made rigid thereon by being clamped firmly to the hub 51, which is an integral part of said head. The cutters 42 and 43 stand upon opposite sides of the axis of the lathe-spindle, and when their points are an equidistance therefrom neither cutter will be in action. Sufficient space is left between them to permit the wire to be fed along. As the cam 39 engages and moves the rocking arm 44 the rear cutter 43 is brought into action, and when the rocking arm 45 is acted upon by the cam 40 the front cutter 42 is brought into action and the rear cutter withdrawn, and so on repeatedly. The cutters may be of any desirable shape, according to the work to be performed, the second cutter to act being provided with a lip, as at 52, Fig. 15, for severing the work from the stock.

Figures 9, 11:
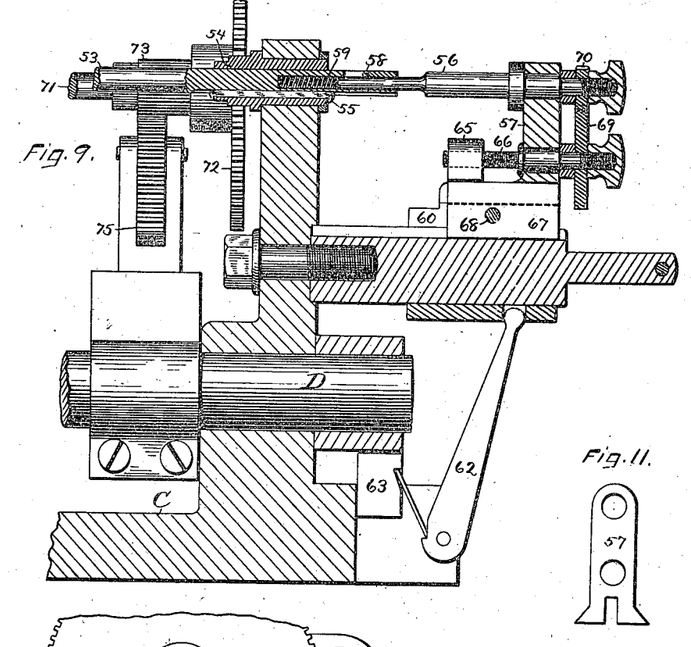
Fig. 9 is a detached vertical section, partly in elevation, of the tail-block portion on line $z$ $z$ of Fig. 7.
Fig. 11 is a side elevation of the frame of the sub-carriage.

Within the frame C of the tail-block I arrange the threading-spindle 53, the same being provided with any ordinary cutting-dies at the end which faces the head-block B. This threading-spindle slides freely through a pinion 54, which is mounted in suitable bearings in the tail-block frame C, and the spindle is made to revolve therewith by means of the spline 55, Fig. 9. The rear end of the threading-spindle 53 is provided with a sub-spindle 56, whose bearing is in the sub-carriage 57. One end of this sub-spindle extends into the threading-spindle, as shown in Fig. 9, and is made to revolve therewith by means of the pin or screw 58, that passes through a slot in the threading-spindle 53 into said sub-spindle, thereby giving them a limited range of longitudinal motion one upon the other. A spring 59 has a tendency to hold these spindles in the position represented in Fig. 9.

Figure 7:
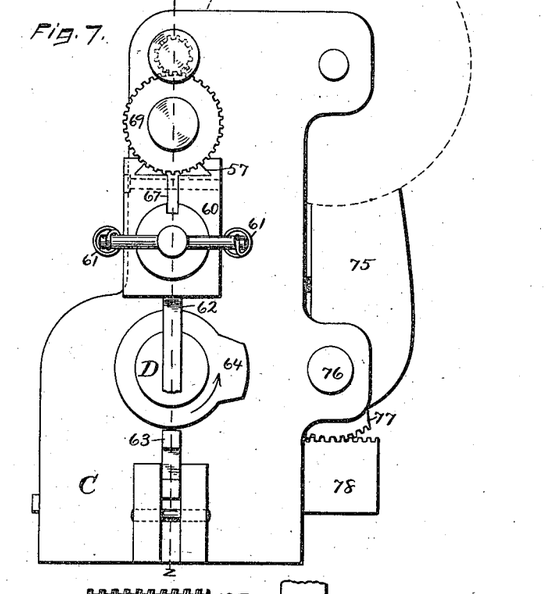
Fig. 7 is an end view of the tail-block and devices for operating the threading-dies.
Figure 8:
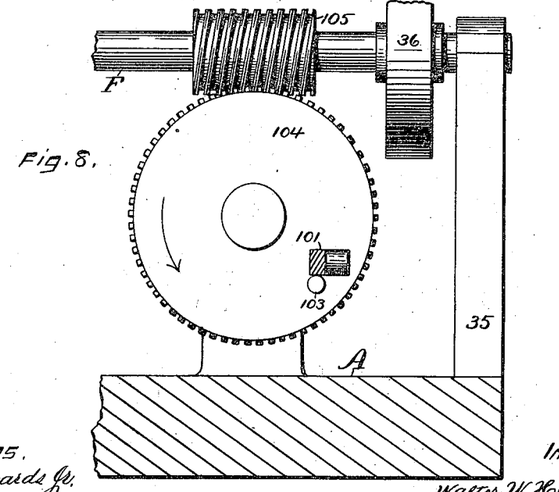
Fig. 8 is a detached sectional view on line $y$ $y$ of Fig. 1.

60 designates a sliding carriage in which the sub-carriage 57 is arranged to slide on suitable ways. This sliding carriage 60 is mounted to slide on suitable ways at the outer end of the tail-block frame. It is pulled in one direction by the springs 61 and forced in the opposite direction by means of the lever 62, the short arm of which is depressed by means of the sliding block 63, which is acted upon by the cam 64 on the end of the cam-shaft D, as best shown in Fig. 7, in which the lower end of the lever 62 is broken away in order to expose to view the sliding block 63. The short arm of the lever 62 is flexible in order to permit said lever to be operated by the vertically-sliding block 63.

The frame of the sub-carriage 57 is slotted longitudinally, as shown in Fig. 11. A lug 65, bored and threaded for the leading-screw 66, is provided with a flat thin base 67, the upper edge of which is received in the slot of the sub-carriage 57 and the lower edge of which enters a groove or way on which the sliding carriage 60 is mounted, so that said lower edge acts as a spline or guide. This flat thin base of the lug 65 is rigidly secured to the sliding carriage 60 by means of a pin or screw 68, Figs. 2 and 9, the same being also indicated by broken lines in Fig. 7. By this means the lug 65 becomes a fixed part of the sliding carriage 60. The leading-screw 66 is provided with a gear-wheel 69, which engages a pinion 70 on the sub-threading-spindle 56.

Figure 10:
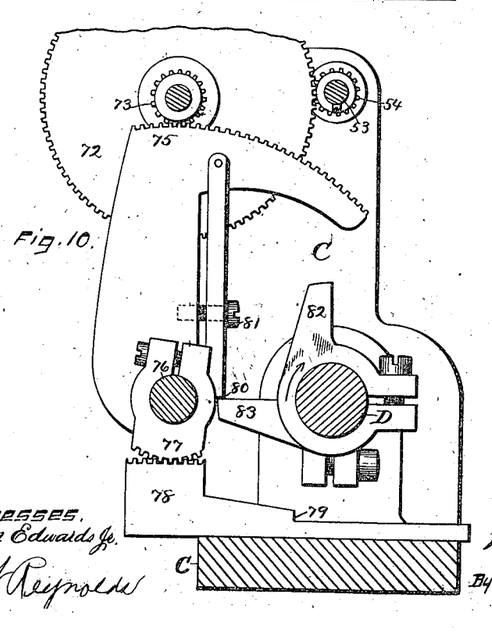
Fig. 10 is a vertical section of the tail-block portion on line $w$ $w$ of Fig. 1, showing the parts on the right of said line.
Figure 12:
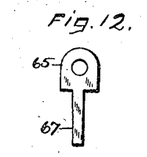
Fig. 12 is a side elevation, as viewed in the opposite direction, of the lug and base for the leading-screw of said sub-carriage.
Figures 13, 14:
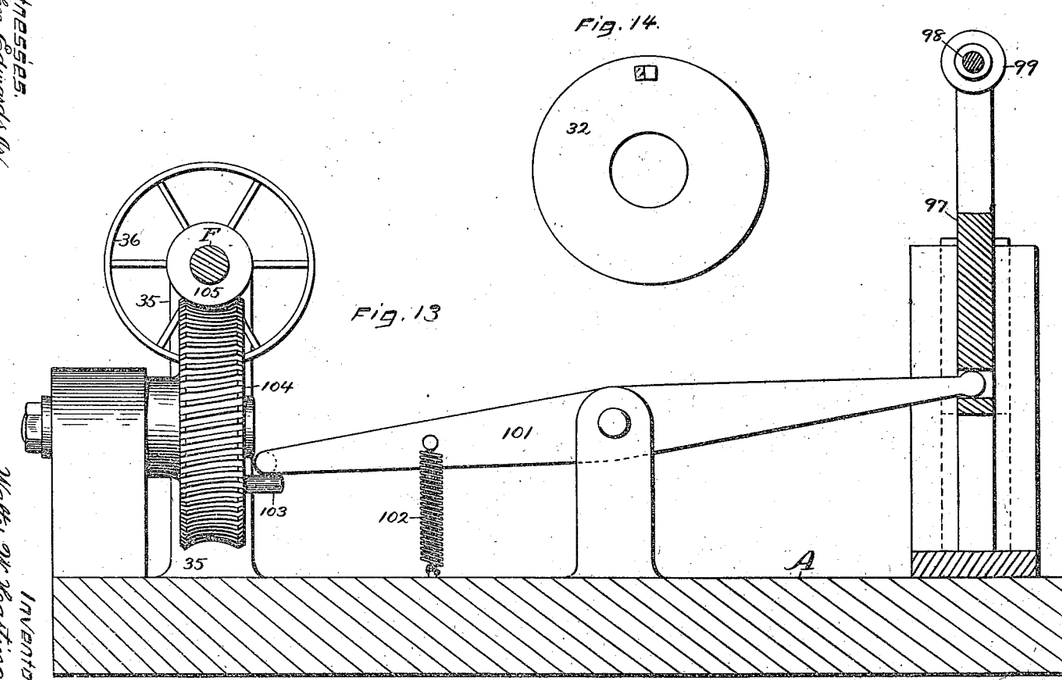
Fig. 13 is a sectional view on line $v$ $v$ of Fig. 1.
Fig. 14 is a side elevation of the feed-cam.

At the rear of the threading-spindle 53 is a shaft 71, upon which a gear-wheel 72 is mounted that engages with the pinion 54. Said shaft 71 is also provided with a pinion 73, that engages with the oscillating circular rack 75. This rack 75 is mounted on a rocking shaft 76, which shaft is also provided with a smaller circular rack 77. This smaller circular rack engages the teeth of a sliding rack 78, said sliding rack being provided with a driving-shoulder 79, Fig. 10. The larger circular rack 75 is also provided with a driving-shoulder 80, the same being in the form of a swinging bar made adjustable by the screw 81, as shown in Fig. 10, whereby said shoulder may be adjusted to vary the throw of the circular rack.

Upon the cam-shaft D, I place a cam 82 for engaging the driving-shoulder 79 of the sliding rack 78, and a cam 83 for engaging the driving-shoulder 80 of the circular rack 75, said cams, circular racks, and gearing operating to turn the threading-spindle 53 and leading-screw 66 in reverse directions, thereby imparting a reciprocating movement to the sub-carriage 57 by its leading-screw being screwed in and out of the lug 65.

Figure 1:
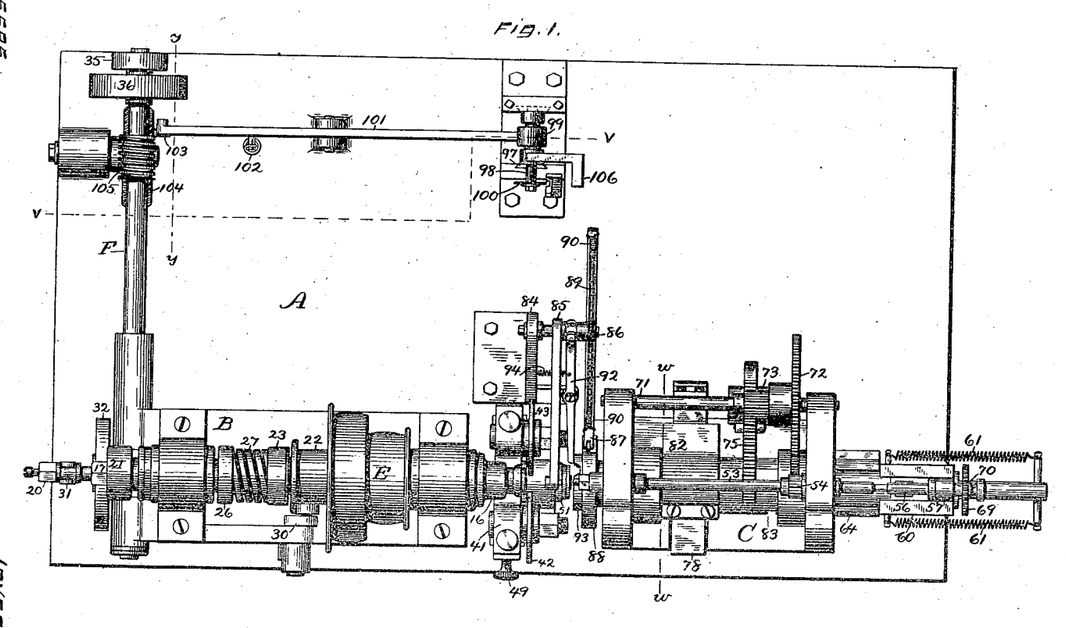

Upon a suitable standard 84 I mount a rocking carrier-arm 85, the hub or shaft of which is provided with a sprocket-wheel 86. (Best shown in Fig. 5.) Upon the same standard is a rocking lever 87, one end of which is engaged by the cam 88 on the cam-shaft D. To this rocking lever I attach a driving-chain 89, that runs over and engages said sprocket-wheel, and I prefer to attach springs 90 to the ends of said chain and lever, so as to hold the chain taut. A spring 91 has a tendency to pull the rocking lever 87 in a direction the opposite of that in which it is moved by the cam 88. The rocking arm 85 not only has a rocking movement on its shaft or bearings, but it is also provided with a slight movement in the direction of its axis. A lever 92 is pivoted to the standard 84 with one end extending downwardly to a side-acting cam 93, Figs. 1 and 2. The other end of this lever is provided with a fork which enters an annular groove in the hub of the sprocket-wheel 86. This cam and lever operate to carry the sprocket-wheel and rocking carrier-arm 85 laterally to the left a short distance, and they are returned by means of the spring 94, Fig. 1.

In the end of the rocking carrier 85 is a socket or holder for a screw and a knockout 95, the same being shown most clearly in Fig. 6, with a screw within the holder. A plain hole in the carrier-arm is all that is necessary to hold the screw in the carrier-arm; but a split tube or other ordinary friction-holder may be substituted for the plain hole, if desired. At the rear of the rocking carrier-arm is a stationary rest 96, and the motion of said carrier-arm through the cam 88 and rocking lever 87 is such as to rock said arm from the position shown in Fig. 5 over to the rear, with its end on the rest 96, as shown in Fig. 6.

97 designates a vertically-sliding saw-carriage having at its upper end a spindle or arbor 98, provided with a driving-pulley 99 and slotting-saw 100. This carriage is reciprocated up and down by means of the lever 101, which is thrown in one direction by the spring 102 and in the opposite direction by means of a cam or pin 103 on the side of the worm-wheel 104. This worm-wheel is driven by means of the second worm 105 on the shaft F, before described as carrying the worm that drives the cam-shaft D.

On the upper part of the saw-carriage 97 is a bracket carrying a cam 106 for acting upon the knockout 95 after the carriage has been depressed sufficiently to carry the saw down past the screw in the carrier on the rest 96.

Wire of the proper size and of any suitable length is inserted through the hollow spindle with its end projecting the proper distance from the holding-chuck 18. A belt upon the pulley E from any suitable source drives the lathe-spindle, while another belt on the pulley 36 imparts motion to the cam-shaft D. The cams 39 and 40, acting on the rocking arms 44 and 45, rock the cutter-head 41 so as to bring the cutters 42 and 43 successively into action, the cutter or chisel upon one side being brought from the rear to bring it into action, and then by the slight rise in the inclination of the cam it is made to cut gradually deeper for the desired depth, after which the other cam acts to withdraw said cutter and bring the opposite cutter into action from the opposite side of the wire.

Figure 17:
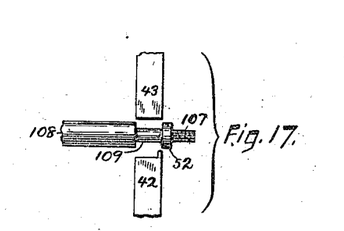
Fig. 17 is an enlarged plan view of a portion of the work and the cutters.
A designates the bed upon which the various parts are mounted.

In Fig. 17 I have illustrated a screw 107 as formed and threaded upon the end of the wire or stock 108, which will be the case in the operation of the machine after one screw has been turned. The rear cutter 43 may first advance and turn down a narrow neck, as at 109, which is a little wider than the length of the threaded body of the intended screw. The opposite cutter 42 is provided with the lip 52, and when advanced by the mechanism described it will cut off the screw 107 previously made and at the same time finish the body to be threaded on the next screw. The least prominent projection from the side face of the cam 31 extends over about one-sixth of the surface of said cam, and as it engages the lever 30 the friction-clutch 22 is withdrawn from its pulley and pressed back against the collar 23 with sufficient friction to hold the spindle against rotation and without releasing the bite of the holding-chuck on the stock. The cam 64 acts on the sliding block 63 to move the lever 62 and sliding carriage 60, thereby moving the threading spindle up to the screw-body on the stock. The cam 83 acts on the shoulder 80 to move the rack 75 and, through the gearing before described, rotate the leading-screw 66 to move the threading-spindle forward, while at the same time it revolves to cut the thread on the screw-blank. The thread of the leading-screw should be such as to move the sub-carriage forward a distance corresponding with the threads to be made on the screw-blank. The spring 59 will, however, permit the threading-spindle 53 to yield slightly and make up for any slight variation or faulty action in the starting of the dies. The cam 82 next engages the shoulder 79, and through the sliding rack and gearing before described revolves the spindle 53 and leading-screw 66 in the opposite direction to back off the sub-carriage and unscrew the threading-dies, after which the springs 61 draw the sliding carriage 60 and threading-spindle wholly back out of the way. The highest point of the cam 31 next acts upon the lever 30 to push the collar 23 farther back and release the bite of the holding-jaws on the stock. The spring 34, pulling on the lever 33, now acts to push the feeding-tube 20 forward and feed the stock the length of one blank, said feeding-tube having been previously drawn back the proper distance by means of the cam 32 and lever 33. When the stock is thus fed forward, the cams 39 and 40 hold the cutters 42 and 43 about central with the lathe-spindle, so that the work may be fed along between said cutters. As the highest point of the cam 31 leaves the shipping-lever 30 the spring 27 returns the collar 23 to its place to renew the bite of the holding-chuck and, with the aid of the springs 28, to bring the friction-clutch again into action, so that the spindle and work are revolved and the cutters may act to turn another screw. Just previous to the cutters acting to sever the screw from the stock the cam 88 comes into a position to permit the spring 91 to pull down the front end of the rocking lever 87, and thereby bring the carrier-arm 85 with its socket or holder into alignment with the screw. The side cam 93 now reaches a position which permits the spring 94 to pull the carrier-arm laterally to bring its holder upon the threaded body of the screw, so as to catch the screw and hold it as it is cut off by the last cutter. Said cam then acts to move the carrier-arm laterally in a reverse direction, while the cam 88 acts through the chain and sprocket-wheel to rock the carrier-arm over to the rear upon the rest 96 at the end of its stroke. The chain 88, being flexible, permits of the lateral movement of the sprocket-wheel and carrier-arm. As the carrier-arm is thrown backward upon its rest the head of the screw projects from one side thereof, as shown. The pin 103 on the worm-wheel 104 acts through the lever 101 to bring down the saw-carriage 97 and carry the saw 100 past the head of the screw for slotting it, the saw being driven by a suitable belt on the pulley 99. As the saw passes below the screw thus slotted the cam 106 at the upper part of the saw-frame acts upon the sliding knockout 95, Fig. 6, to force the screw from the carrier-arm, after which the spring 102 returns the saw-carriage to its elevated position, and these operations are repeated indefinitely as long as may be desired. When the carrier-arm is moved laterally to receive a screw, the end of the screw forces the knockout into the position shown in Fig. 6, so that it is ready to be operated upon by the cam 106 after the screw is slotted, as before described.

While I have described my machine as an automatic screw-making machine, which it is in fact, it is evident that the whole machine may not necessarily be used at one time, and also that many of the combinations and devices which I have shown and described would have the same functions and operate in the same way if they were used in a machine which did less than make a complete screw. For instance, the slotting attachment might be omitted, if desired, and so far as the other parts of the machine are concerned some other slotting attachment might be substituted for that herein shown and described. It is also evident that a portion of the machine might be used for turning screws only without employing the threading attachment, all of which and other changes will readily suggest themselves to skilled mechanics.

Some of the advantages of my invention are that both the friction-clutch and the holding-chuck may be operated by means of a single lever. The tension of the spring 27 may be adjusted to increase the pressure of the interposed sleeve upon the chuck. The sliding carriage which moves the threading-spindle may be brought quickly into action, and, after doing its work, removed where it is out of the way. The threading-spindle is fed forward by a leading-screw instead of being dependent upon the thread of the screw being cut for moving it. The operating-cams can be mainly arranged upon a single shaft, and the screw may be taken out of the way by the carrying-arm and slotted at the rear part of the machine.

In several of the claims I have used the definite article "the" in connection with certain mechanisms; but in so doing I do not wish to waive any of my rights as to equivalents.

I claim as my invention—

1. In a screw-machine, the combination of the outer and inner sleeves rigidly connected, said inner sleeve bearing the holding-chuck, the interposed sleeve 19, and the mechanism for sliding said interposed sleeve for operating said holding-chuck, substantially as described, and for the purpose specified.

2. In a screw-machine, the combination of the outer and inner sleeves rigidly connected, the interposed sliding sleeve, the collar 23, connected with said interposed sleeve, the friction-clutch, the spring 27, and a shipping-lever for moving said clutch against said collar, substantially as described, and for the purpose specified.

3. In a screw-machine, the combination of an outer and inner sleeve rigidly connected, the interposed sleeve, the collar 23, connected to said interposed sleeve, the spring 27, pressing against said collar, the friction-clutch 22, its shipping-lever, the feed-tube 20 within said inner sleeve, and the mechanism for operating said feed-tube, substantially as described, and for the purpose specified.

4. The combination of the spindle having holding and feeding mechanism, the friction-clutch, the collar 23 on said spindle, a spring 27 for pressing against said collar, lighter springs between said collar and clutch, and the clutch-operating mechanism, substantially as described, and for the purpose specified.

5. The combination of the spindle having holding and feeding mechanism, the friction-clutch, the collar 23 on said spindle, a spring 27 for pressing against said collar, lighter springs between said collar and clutch, the shipping-lever 30, the cam 31, having greater and lesser projections, the lesser of which acts to release the clutch and hold the spindle by the friction of said shipping-lever on said collar, and the threading mechanism acting upon the work while the spindle is so held, substantially as described, and for the purpose specified.

6. In a screw-machine, the cutter-head having rocking arms, the cams for operating said arms, the interposed bails between said arms and cams, and adjusting-screws 49 for adjusting the position of said bails on said arms, substantially as described, and for the purpose specified.

7. A screw-machine having a spindle provided with holding and feeding mechanism, the cutters, and operating mechanism for turning the screw-blanks, the threading-spindle 53, a carriage for reciprocating said spindle longitudinally to and from the work when in said holding mechanism, and the mechanism for rotating said spindle in reverse directions, substantially as described, and for the purpose specified.

8. In a screw-machine, the combination of the threading-spindle, the sub-carriage 57, with which said spindle is connected, a sliding carriage 60, on which said sub-carriage is mounted, a leading-screw and threaded lug for governing the sliding movement of said sub-carriage on said sliding carriage, the mechanism for moving said sliding carriage to and from its work, and the mechanism for rotating said threading-spindle and leading-screw in reverse directions, substantially as described, and for the purpose specified.

9. In a screw-machine, the combination of the spring-pressed sliding carriage 60, the two-armed lever 62, the short arm of which is flexible, the sliding block for acting on said flexible short arm, and the cam 64 for operating said sliding block, substantially as described, and for the purpose specified.

10. In a screw-machine, the combination of the threading-spindle, the pinion 54, mounted to revolve in bearings, a spline for permitting said spindle to slide within said pinion and to necessitate their simultaneous rotation, the cams 82 and 83, the circular rack 75, having a driving-shoulder, the sliding rack 78, having a driving-shoulder, which shoulders are engaged by said cams, and connecting-gearing whereby said cams 82 and 83 cause said threading-spindle to rotate first in one direction and then the reverse, substantially as described.

11. In a screw-machine, the combination of the sliding threading-spindle, the mechanism for rotating it first in one direction and then in the other, the pinion 70, rotating with said threading-spindle, the gear-wheel 69, the leading-screw 66, rotating with said gear-wheel, and the threaded lug 65, with which said leading-screw is engaged, whereby the rotation of said sliding threading-spindle also rotates the leading-screw for advancing said spindle on and off the screw being cut, substantially as specified.

12. In a screw-machine, the combination of the sliding threading-spindle 53, the mechanism for rotating the same first in one direction and then in the other, the sub-spindle 56, fitted to rotate with said spindle 53 and also to slide therein, a spring, as at 59, Fig. 9, acting to press the spindle 53 forward on the end of said sub-spindle, the pinion 70 on said sub-spindle, the gear 69, and its leading-screw, substantially as described, and for the purpose specified.

13. In a screw-machine, the combination of the lathe-spindle, holding and turning devices, the rocking carrier-arm having also a lateral movement parallel to the axis of the lathe-spindle, and the mechanism for rocking said carrier-arm into its position in front of said lathe-spindle, then moving it laterally to take the screw, and rocking it back out of the way, substantially as described, and for the purpose specified.

14. In a screw-machine, the combination of the lathe-spindle, holding and turning devices, the rocking carrier-arm, the sprocket-wheel mounted thereon, the chain 88, extending over said sprocket-wheel, the lever 87, to which said chain is connected, the spring 91, and cam 88, substantially as described, and for the purpose specified.

15. The combination, with a screw turning and threading machine, of the rocking carrier-arm, mechanism for operating the same, the rest at one end of the stroke of said arm, and the sawing mechanism, substantially as described, and for the purpose specified.

16. The combination of the spindle having holding and feeding mechanism, the cutters and operating mechanism for turning screw-blanks, the threading-spindle and its operating mechanism, the rocking carrier-arm and its operating mechanism, the slotting-saw at one end of the stroke of said carrier-arm, and the mechanism for operating said saw, substantially as described, and for the purpose specified.

17. The combination of the spindle provided with holding and feeding mechanism, the cutters and operating mechanism for turning screw-blanks, a sliding carriage for reciprocating said spindle longitudinally to bring it to and from its work, a sub-carriage mounted on said sliding carriage, a leading-screw governing the position of said sub-carriage on said sliding carriage, and the mechanism for rotating said threading-spindle and leading-screw first in one direction and then the reverse, substantially as described, and for the purpose specified.

18. The combination of the spindle having feeding and holding devices, the feed-lever 32, shipping-lever 30, the turning or cutting tools, the rocking cutter-head, the threading-spindle and its sliding carriage, the lever 62, sliding block 63, the sliding rack 78, circular rocking rack 75, the cam-shaft D, having cams 33, 31, 40, 39, 82, 83, and 64, substantially as described, and for the purpose specified.

19. The combination of the spindle, feeding, holding, cutting, threading, and slotting mechanisms, a carrier working between the cutting and slotting devices, the cam-shaft D, having the respective cams for operating the feeding, holding, cutting, and threading devices, and also for operating said carrier, and the shaft F with worm-gear for operating said shaft D and also for operating the slotting-saw carriage, substantially as described, and for the purpose specified.

WALTER W. HASTINGS.

Witnesses:
S. T. J. BYAM,
ELMER E. NEAL.